Oct. 31, 1950         T. A. COHEN         2,527,797
MOTOR CONTROL SYSTEM FOR RECORDING INSTRUMENTS
Filed Nov. 3, 1945
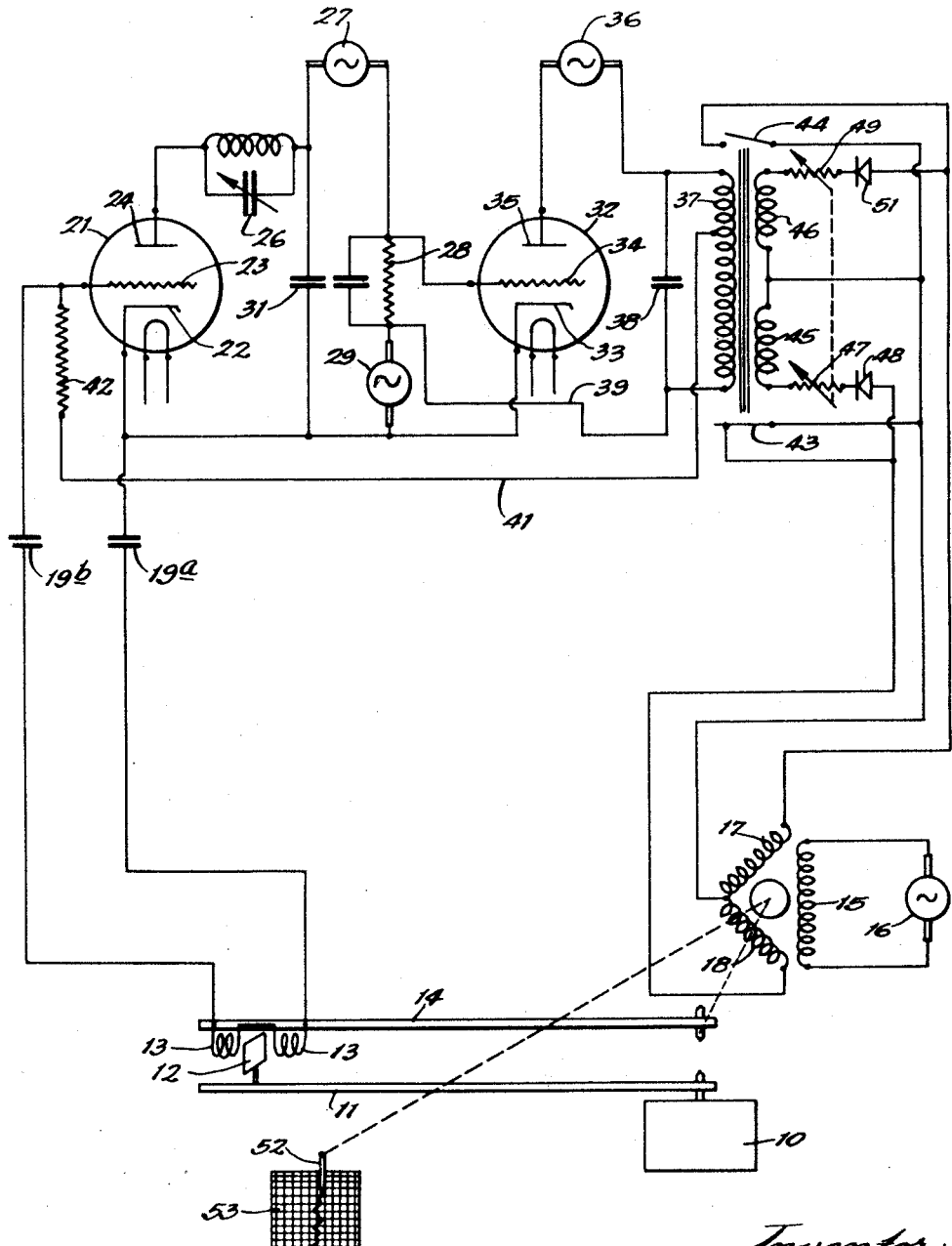
Inventor:
Theodore A. Cohen,
By Dawson, Booth & Spangenberg,
Attorneys.

Patented Oct. 31, 1950

2,527,797

UNITED STATES PATENT OFFICE 2,527,797

MOTOR CONTROL SYSTEM FOR RECORDING INSTRUMENTS

Theodore A. Cohen, Chicago, Ill., assignor to Wheelco Instruments Company, a corporation of Illinois Application November 3, 1945, Serial No. 626,510

9 Claims. (Cl. 318—32)

1

This invention relates to recording instruments and more particularly to electrical instruments for recording and/or controlling the value of a condition such, for example, as temperature, pressure or the like.

One of the objects of the invention is to provide a recording instrument in which the tendency to hunt is compensated electrically so that a stable and sensitive response is obtained.

Another object is to provide an instrument in which the degree of compensation and, therefore, the sensitivity of the instrument can be easily adjusted.

Still another object is to provide an instrument in which the voltage generated by the shaded pole windings of a reversible shaded pole motor may be utilized to provided compensation to prevent hunting.

A further object is to provide an instrument employing a shaded pole motor which is so controlled as to produce a dynamic braking effect to prevent overrunning or coasting.

The above and other objects and advantages of the invention will be more readily apparent from the following description when read in connection with the accompanying drawing, in which the single figure is a circuit diagram of an instrument embodying the invention.

The instrument illustrated is adapted to record and may, if desired, be utilized to control a variable physical condition such, for example, as temperature or pressure. For this purpose the instrument comprises a sensitive unit 10 for producing movement of a pointer 11 in response to variations in the condition. The unit 10 may be any desired type of unit such as a millivolt meter instrument, a thermocouple instrument or other pressure or temperature sensitive devices which will move the pointer to a position dependent upon the instantaneous value of the pressure, temperature or like condition to be recorded. The pointer 11 carries one element of a variable reactance device shown as a metal flag 12 which moves with the pointer. The flag 12 is adapted to move between a pair of coils 13 so that the reactance of the coils will vary with the extent to which the flag projects between them. The coils are carried by an arm 14 which is adapted to be turned to follow the motion of the pointer 11 by a reversible motor shown as a shaded pole motor having a main winding 15 connected to a source of alternating current 16 and a pair of shaded pole windings 17 and 18.

The variable reactance device may form a part

2 of an oscillator circuit of the type more particularly described in my Patent No. 2,228,163, issued January 7, 1941. As shown, the coils 13 are connected through the condensers 19a and 19b to the control circuit of vacuum tube 21 in a portion of an oscillator circuit. One side of the coils is connected to the cathode 22 of the tube 21 through condenser 19a and the other side is connected to the control grid 23 through condenser 19b. The plate 24 of the tube is connected through a plate tank circuit including an inductance coil 25 and a condenser 26 to a source of supply of alternating current illustrated at 27. The plate circuit is connected through a load resistor 28 and a second source of alternating current 29 to the cathode 22. A bypass condenser 31 is connected across the plate circuit to prevent the flow of high frequency oscillatory currents through the alternating current sources 27 and 29 which may be windings on a power transformer.

The steady state output of the tube 21 is amplified by a tube 32 including a cathode 33, a control grid 34 and a plate 35. The control grid 34 is connected across the load resistor 28 so that the tube 32 will be controlled partially in response to the voltage drop across the resistor 28. The plate 35 of tube 32 is connected to a source of alternating current 36 which may be a winding on the power transformer including the sources 27 and 29 to one end of a relay coil 37. A condenser 38 is connected across the relay coil and the opposite end of the coil is connected through a wire 39 to the resistor 28.

Feed back to the tube 21 is provided by a wire 41 from a tap upon coil 37 at the necessary point to produce the desired feedback voltage and connected to the grid 23 of the tube 21 through a resistor 42. It will be seen that the oscillator and amplifier circuits as so far described are substantially similar to those described and claimed in my Patent No. 2,228,163. In this circuit, when the flag 12 extends partially between the coils 13, the instrument is in its normal or neutral position so that the oscillator will produce a predetermined output current. This output current will produce a voltage drop across the resistor 28 which causes the amplifier tube 32 to supply a predetermined normal current to the relay coil 37.

Upon movement of the pointer 11 to move the flag 12 away from the coils 13, the tuning of the oscillator will be varied to increase its oscillation and to reduce the voltage drop across the resistor 28. This reduces the bias on the control grid 34 causing an increase in the plate current of the tube 32 to increase the current flow through the relay coil 37. Similarly, if the flag 12 tends to move further into the coils, the plate current of the tube 32 will be reduced to decrease the current through the relay coil. As explained in my patent, referred to above, the changes in the current through the relay coil will rise and fall sharply upon movement of the flag to produce a sensitive control.

The relay coil 37 is utilized to control the shaded pole motor through a pair of switches 43 and 44. The switch 43 is connected across the shaded pole winding 18 and is normally biased to a closed position to be opened by the relay coil in response to a predetermined current flow therein. The switch 44 is connected across the shaded pole winding 17 and is normally biased to an open position to be closed in response to a smaller predetermined current in the relay coil. When the normal current is flowing through the relay coil, the switch 44 will be moved to a closed position but the current in the coil is not sufficient to open the switch 43 so that both windings 17 and 18 are short circuited and the motor is held stationary. Upon an increase in current above the normal flow, the switch 43 will be opened by the relay coil to cause the motor to operate in one direction while a decrease in current below the normal flow will allow the switch 44 to open to cause the motor to turn in the opposite direction.

One of the advantages of this type of control is that it provides a dynamic braking effect in the motor causing prompt stoppage of the motor upon closing of both switches. With the motor operating in either direction, depending upon which switch is open, it would normally tend to coast upon operating the control to interrupt its movement. With the present construction, however, short circuiting of the shaded pole windings produces a dynamic braking effect in the motor which will cause it to stop quickly so that it will not tend to coast beyond the desired control position.

In order to compensate for any tendency of the instrument to hunt, compensating windings 45 and 46 are provided, magnetically associated with the relay coil 37. The winding 45 is connected through a variable resistor 47 and a rectifier 48 across the shaded pole winding 18 and the winding 46 is similarly connected through a variable resistor 49 and a rectifier 51 across the shaded pole winding 17. When the switch 43 is opened a voltage will be induced in the winding 18 which will be impressed across the compensating winding 45 in a direction to oppose the effect of the relay coil. Similarly, when the switch 44 is open, a voltage will be induced in the winding 17 which will be impressed across the winding 46 in a direction to oppose the effect of the relay coil. The effect of the compensating windings can be varied by adjusting the resistors 47 and 49 which are preferably coupled for simultaneous adjustment so that the sensitivity or the control range of the instrument can easily be adjusted.

In a typical example assume that the flag 12 is further between the coils 13 than its normal position so that the current flow through the relay coil 37 is less than normal and the switch 44 is open. At this time the winding 46 is energized to oppose the flux in the relay coil 37 so that the switch 44 will remain open until the flag 12 has been moved out of the coils 13 in an amount slightly greater than the maximum permissible position of the flag between the coils for the stable control range. As soon as the switch 44 is closed, the compensating effect of winding 46 is removed, and at this time the flag 12 is positioned at substantially the center of its permissible range of movement so that the instrument is operating substantially at the center of its control range and will not tend to hunt or flutter on minor changes which do not carry the instrument beyond its control range. Upon a control operation in the opposite direction with the switch 43 opened, the current in the relay coil 37 will be above normal and the motor will turn in a direction to move the coils 13 toward the flag 12. At this time the voltage induced in the winding 18 will be impressed on the winding 45 in a direction to assist the flux of the relay coil so that the switch 43 will be retained open slightly longer than it would if the winding 45 were not present. This operation again brings the instrument to a condition substantially in the center of its control range when the switch 43 is allowed to close. Thus a very stable operation in both directions is produced without hunting and without adversely affecting the sensitivity of the instrument.

To record the condition sensed by the unit 16, any desired type of recording and/or control mechanism may be provided. As shown, the motor is connected to a pen 52 which moves over a chart 53 driven by a motor 54 to provide a continuous record of changes in the condition. It will be understood that this recorder is shown only for purposes of illustration and that any desired type of mechanism for recording or for controlling the condition might be operated by the motor.

While one embodiment of the invention has been shown and described in detail, it will be understood that this is illustrative only and is not intended as a definition of the scope of the invention, reference being had for this purpose to the appended claims.

What is claimed is:

1. In a recording instrument, a reversible motor having a pair of reversing windings, switches for controlling the windings respectively, a relay coil for operating the switches, a circuit to supply a normal current to relay coil, which relay coil operates one of the switches when its current is above normal and the other of the switches when its current is below normal means responsive to a condition to be recorded to vary from normal the flow of current through the relay coil, means operated by the motor to return to normal the flow of current through the relay coil upon a deviation thereof from normal in response to the last named means, a compensating winding magnetically associated with the relay coil, and means controlled by the switches to supply a current to the compensating winding opposing the effect of a deviation from normal of the current in the relay coil.

2. In a recording instrument, a reversible motor having a pair of reversing windings, switches for controlling the windings respectively, a relay coil for operating the switches, a circuit to supply a normal current to relay coil, which relay coil operates one of the switches when its current is above normal and the other of the switches when its current is below normal means responsive to a condition to be recorded to vary from normal the flow of current through the relay coil, means operated by the motor to return to normal the flow of current through the relay coil upon a deviation thereof from normal in response to the last named means, and a pair of compensating windings magnetically associated with the relay coil and controlled by the switches respectively, the compensating windings being so arranged that they will oppose the effect of a deviation from normal of the current in the relay coil.

3. In a recording instrument, a reversible shaded pole motor having a pair of shaded pole windings, a pair of switches connected across the windings respectively, a relay coil for operating the switches, means responsive to a condition to be recorded to control the current in the relay coil, means operated by the motor to return to normal the current in the relay coil upon a deviation thereof from normal in response to the last named means, and a pair of compensating windings magnetically associated with the relay coil and connected across the shaded pole windings respectively, the compensating windings being so arranged that they will oppose the effect of a deviation from normal in the relay coil.

4. In a recording instrument, a reversible shaded pole motor having a pair of shaded pole windings, a pair of switches connected across the windings respectively, a relay coil for operating the switches, the switches being so constructed and arranged that they will both be closed in response to normal current in the relay coil, one will open in response to reduced current and the other will open in response to increased current, means responsive to a condition to be recorded to control the current in the relay coil, means operated by the motor to return to normal the current in the relay coil upon a deviation thereof from normal in response to the last named means, and a pair of compensating windings magnetically associated with the relay coil and connected across the shaded pole windings respectively, the compensating windings being so arranged that they will oppose the effect of a deviation from normal in the relay coil.

5. In a recording instrument, a reversible shaded pole motor having a pair of shaded pole windings, a pair of switches connected across the windings respectively, a relay coil for operating the switches, means responsive to a condition to be recorded to control the current in the relay coil, means operated by the motor to return to normal the current in the relay coil upon a deviation thereof from normal in response to the last named means, a pair of compensating windings magnetically associated with the relay coil and connected across the shaded pole windings respectively, and rectifiers in circuit with the compensating windings of a polarity such that the compensating windings will oppose the effect of a deviation from normal in the relay current.

6. In a recording instrument, an oscillator circuit, means for tuning the oscillator circuit to vary its output including a pair of relatively movable reactance elements, means responsive to a condition to be recorded to move one of the reactance elements, a reversible motor to move the other reactance element to follow up said one reactance element in such a manner as to return the output of the oscillator circuit to a normal value upon a deviation thereof from normal, a relay coil responsive to the output of the oscillator circuit to control the motor, a compensating winding magnetically associated with the relay coil, and means controlled by the relay coil to supply a compensating current to the compensating winding to oppose the effect of a deviation from normal of the current in the relay coil.

7. In a recording instrument, an oscillator circuit, means for tuning the oscillator circuit to vary its output including a pair of relatively movable reactance elements, means responsive to a condition to be recorded to move one of the reactance elements, a reversible motor to move the other reactance element to follow up said one reactance element in such a manner as to return the output of the oscillator circuit to a normal value upon a deviation thereof from normal, a relay coil responsive to the output of the oscillator, a pair of switches operated by the relay coil to control operation of the motor, and a pair of compensating windings controlled by the switches respectively and so arranged relative to the relay coil as to oppose the effect of a deviation from normal of the current in the relay coil.

8. In a recording instrument, an oscillator circuit, means for tuning the oscillator circuit to vary its output including a pair of relatively movable reactance elements, means responsive to a condition to be recorded to move one of the reactance elements, a reversible motor to move the other reactance element to follow up said one reactance element in such a manner as to return the output of the oscillator circuit to a normal value upon a deviation thereof from normal, the motor being a shaded pole motor having a pair of shaded pole windings, a pair of switches to short circuit the windings respectively, a relay coil responsive to the output of the oscillator to control the switches, compensating windings magnetically associated with the relay coil and connected across the shaded pole windings respectively, and rectifiers connected to the compensating windings of such polarity that the compensating windings oppose the effect of a deviation from normal of the current in the relay coil.

9. In a recording instrument, a reversible motor, circuit control elements for controlling the motor, a coil for operating the circuit control elements to cause the motor to run in one direction or the other in accordance with current flow through the coil, a pointer, means responsive to a condition to be recorded to move the pointer, a follower movable adjacent the pointer, a connection from the motor to the follower, cooperating means on the pointer and the follower to produce a variation in an electrical effect in response to a change in the relative position of the pointer and the follower, means responsive to said electrical effect to control the current flow through the coil, a compensating winding adjacent and magnetically related to the coil, and means controlled by the control elements to supply a compensating current to the winding opposing the effect of a deviation from normal of the current in the coil.

THEODORE A. COHEN.

REFERENCES CITED

The following references are of record in the file of this patent:

UNITED STATES PATENTS

| Number | Name | Date |
|---|---|---|
| 2,126,910 | Moseley | Aug. 16, 1938 |
| 2,153,986 | MacLaren, Jr. | Apr. 11, 1939 |
| 2,277,653 | Evans | Mar. 24, 1942 |
| 2,287,002 | Moseley | June 16, 1942 |
| 2,377,474 | Allwein | June 5, 1945 |